United States Patent [19]

Jackson, Jr.

[11] Patent Number: 5,032,076
[45] Date of Patent: Jul. 16, 1991

[54] METAL MOLD WITH EXTENDED HEAT TRANSFER SURFACE

[75] Inventor: Kenneth L. Jackson, Jr., Farmington, N.H.

[73] Assignee: Davidson Textron Inc., Dover, N.H.

[21] Appl. No.: 551,317

[22] Filed: Jul. 12, 1990

[51] Int. Cl.⁵ .................. B29C 41/04; B29C 41/46
[52] U.S. Cl. .................. 425/435; 249/79; 264/310; 264/DIG. 60; 425/DIG. 246
[58] Field of Search .......................... 249/79, 80, 137; 264/302, 310, 311, 319, 327, DIG. 60; 425/144, 425, 435, 547, , 378.1, DIG. 110, DIG. 246

[56] References Cited

U.S. PATENT DOCUMENTS

| | | | |
|---|---|---|---|
| 2,370,953 | 3/1945 | Greenberg | 425/425 |
| 3,914,361 | 10/1975 | Shiina et al. | 264/310 |
| 4,140,743 | 2/1979 | Ross | 264/310 |
| 4,382,757 | 5/1983 | Roy et al. | 249/79 |
| 4,489,028 | 12/1984 | Masters | 264/154 |
| 4,638,854 | 1/1987 | Noren | 425/435 |

FOREIGN PATENT DOCUMENTS 487769 2/1976 U.S.S.R. .................. 425/435

Primary Examiner—Jay H. Woo
Assistant Examiner—James P. Mackey
Attorney, Agent, or Firm—Reising, Ethington, Barnard, Perry & Milton

[57] ABSTRACT

A mold assembly for molding thermoplastic particles into a solid thin shell includes a metal shell having a cavity and including an outer surface exposed to a heat source and further including an inner surface on which thermoplastic material is cast and fused to form a thin layer thermoplastic shell. The heat transfer area of the metal shell is increased by providing a plurality of heat transfer pins connected to the outer surface; each of the heat transfer pins has an extended outside surface area exposed to the heat source for heating the metal shell and each of the heat transfer pins further includes a large diameter head portion which is joined to the metal shell by a capacitive weld nugget formed solely between the large diameter head portion and the outer surface of the metal shell without disrupting the metal shell at surface portions thereof formed between the heat transfer pins.

1 Claim, 2 Drawing Sheets

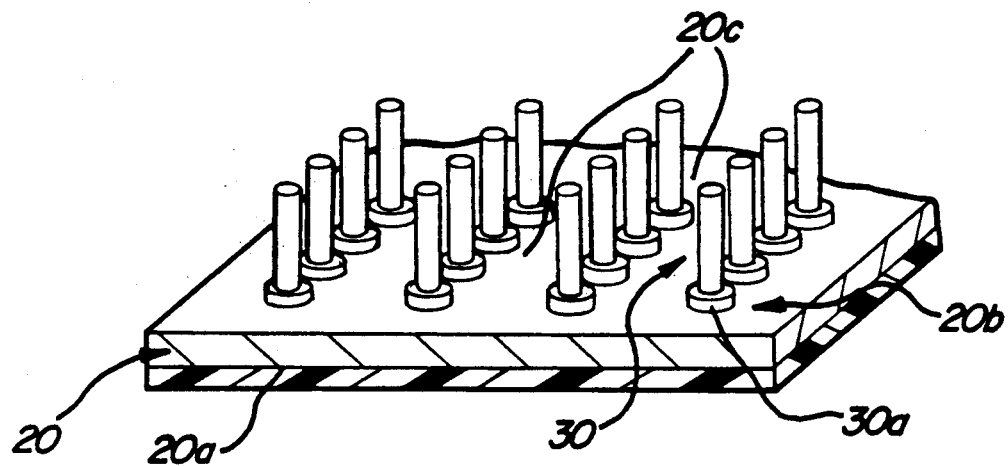
_Fig-3_
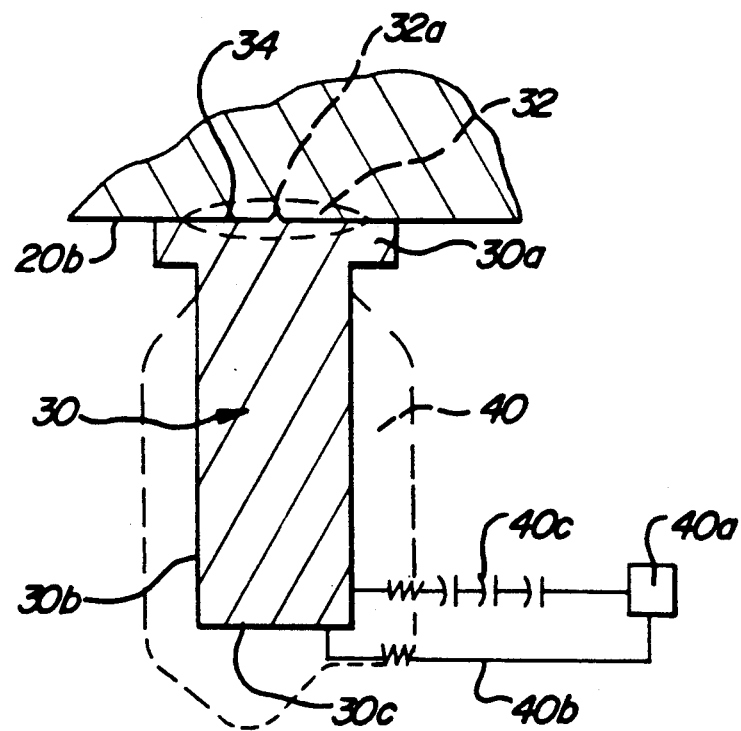
_Fig-4_

METAL MOLD WITH EXTENDED HEAT TRANSFER SURFACE

FIELD OF THE INVENTION

This invention relates to molding apparatus and more particularly to metal shell molds having an outer surface exposed to a heat source and an inner surface heated to a temperature at which heat gellable thermoplastic material deposited thereon will fuse into a thin, solid thermoplastic shell.

BACKGROUND OF THE INVENTION

Currently thermoplastic powder or thermoplastic slurries, known as dry or liquid plastisol, are cast on the inner surface of a thin metal mold member heated to the fusion temperature of the deposited material to form a gell coat which is cured to form a thin, solid thermoplastic shell. The thin metal mold member remains heated until a thin layer of thermoplastic material is built-up on the inner surface to form a thin plastic shell product suitable for use as an outer skin or shell covering on automotive interior products such as armrests, door panels, instrument panels and on automotive exterior products such as side rail bumpers, moldings or bumper fascias.

Examples of such heated mold assemblies and processes are shown in U.S. Pat. Nos. 3,680,629 and 4,389,177.

One form of heating is to direct hot gas over a flat outer surface of the heated mold to transfer heat into the metal of the mold for transfer therethrough into the thermoplastic material (sometimes referenced as plastisol material) to cause the plastisol (either wet or dry) to gel and cure. In the gel stage the plastisol is fused together into a thin layer of material. Thereafter the fused material is cured at an elevated temperature to form a finished product with desired physical characteristics. Examples of such gas heated molds are shown in U.S. Pat. Nos. 4,621,995 and 4,623,503.

In the past it has been recognized that the heat transfer rate for directing heat from the heat source to the deposited plastisol could be improved by providing fins on the outer surface of the mold and flowing heated air across the fins to increase heat transfer to the plastisol. The fins provided increased heat transfer area for flow of heat from the heat source to the plastisol. The attachment of the fins, however, required soldering, brazing or welding steps that produce excessive heat flow into the thin metal shell of the mold. Such past practices can cause distortion or thermal cracks in the mold during fabrication. Additionally such attachment methods can cause degradation of the properties of the metal in the vicinity of the connections.

An example of such property degradation is grain growth in the mold metal which makes the metal susceptible to cracking.

SUMMARY OF THE INVENTION

A feature of the present invention is to provide a thin metal mold having an extended heat transfer surface area thereon formed without significantly heating the metal mass comprising the metal mold and without distorting the physical dimensions of the mold and without degradation of the properties of the mold.

Another feature of the present invention is to provide such an extended heat transfer area on a thin metal mold for casting thermoplastic material as a thin deposit of plastisol cast on the inner surface of the mold and heated to form a gel coat which is cured to form a solid, thin plastic skin or plastic shell.

Still another feature is to provide for such an extended heat transfer area by a plurality of heat transfer pin each having an enlarged head juxtaposed against the outer surface of the thin metal mold and connected thereto by a capacitive weld joint.

Further features, objectives and advantages of the present invention will become more apparent in view of the following description when taken in conjunction with the accompanying drawings wherein:

BRIEF DESCRIPTION OF THE DRAWINGS

FIG. 3 is a fragmentary perspective view of the underside of the mold in FIG. 2 showing an array of heat transfer pins formed thereon;

FIG. 4 is an enlarged fragmentary view of a capacitive weld joint formed between each of the heat transfer pins and the outer surface of the mold in FIG. 2.

DESCRIPTION OF THE PREFERRED EMBODIMENT

Figure 1:
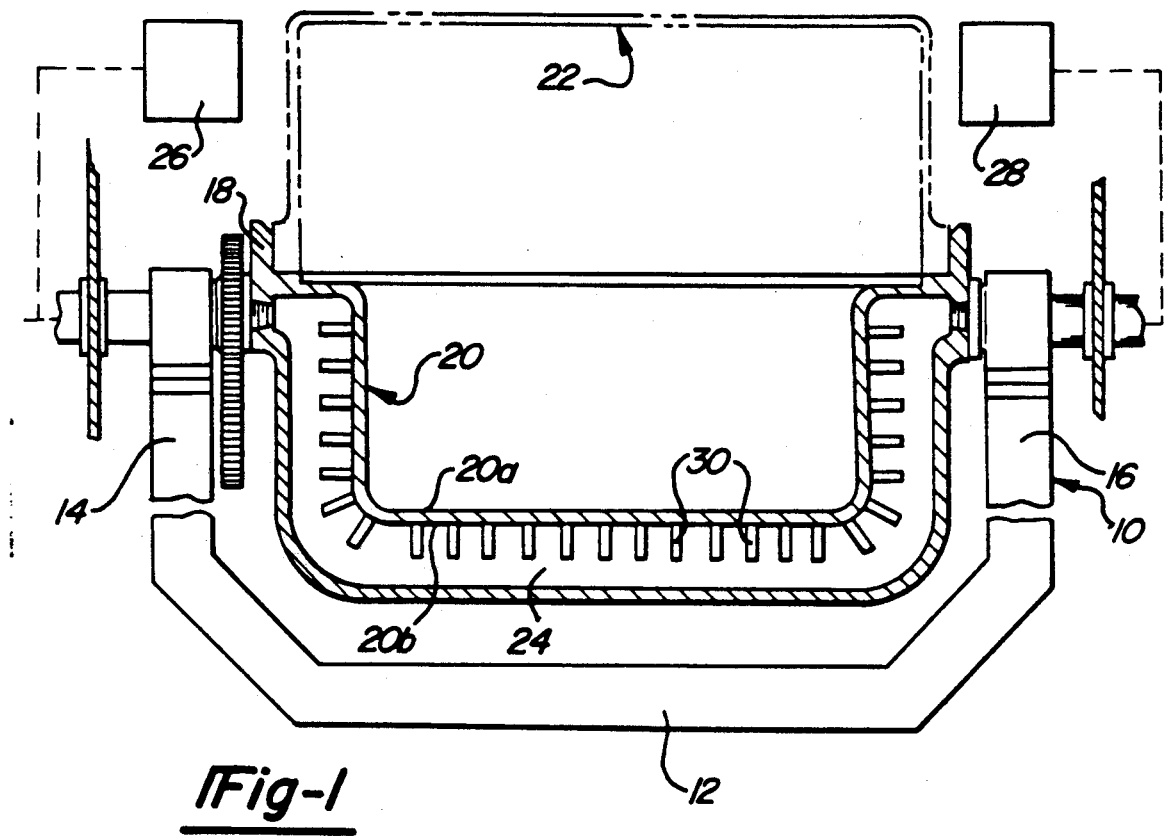
FIG. 1 is a diagrammatic view of molding apparatus for casting plastisol against a mold heated by hot air flow thereacross.
Figure 2:
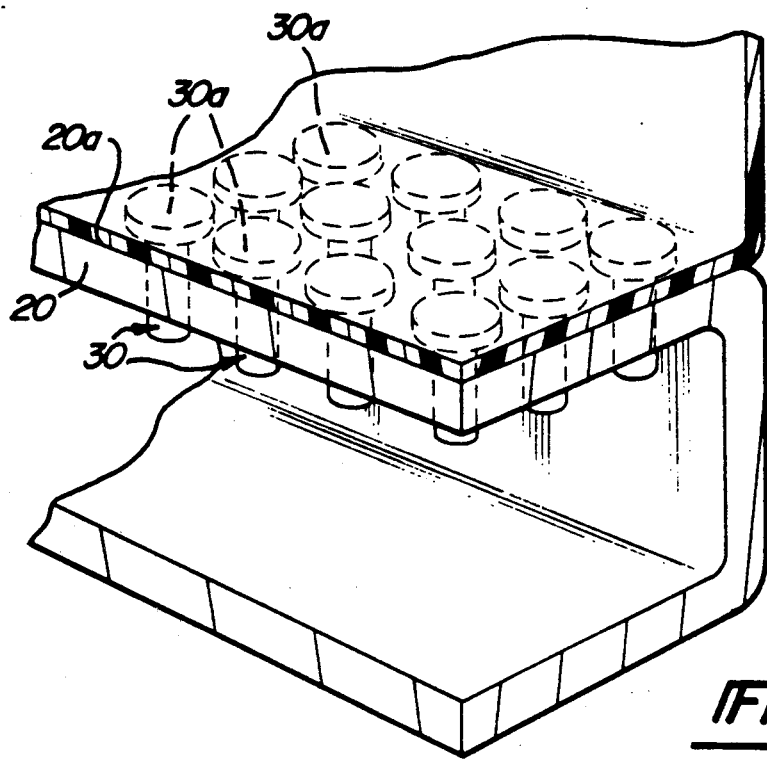
FIG. 2 is a fragmentary sectional view of the mold showing a deposited layer of fused plastisol thereon.

Referring now to FIG. 1, a molding apparatus 10 is illustrated. The mold apparatus 10 is representatively shown as including a base 12 having spaced trunnion arms 14, 16 for rotatably supporting a mold support 18. The trunnion arms 14, 16 define an axis about which a thin mold shell 20 is rotated for casting plastisol thereagainst from a powder box 22 connected to the shell 20 as shown in FIG. 1.

The mold support 18 defines a mold heating and cooling cavity 24 for directing either heated or cooled air from a heater 26 or a cooler 28.

The plastisol is distributed from the box 22 in a dry form. If desired a charge of liquid plastisol would be equally suitable for use with the mold of the present invention. Examples of such sources (either dry plastisol or liquid plastisol) are set forth in U.S. Pat. No. 4,623,503 which is referenced for purposes of better understanding the operation and structure of the mold apparatus 10 and the plastisol material to be gelled and cured on the mold shell 20.

In accordance with the present invention, the mold shell 20 has an inner surface 20a against which the plastisol material is cast. The material is a suitable thermoplastic resin material such as particles of polyvinyl chloride having a core of resin with a suitable plastisizer and having an outer surface of color pigment material thereon as described in greater detail in U.S. Pat. No. 4,784,911.

In order to gell and cure such material, it is necessary to provide an efficient transfer of heat from the gas flow through the cavity 24 into the shell 20, thence through the thickness of the metal in the shell 20 and into the thermoplastic material deposited on the inner surface 20a. To increase the heat transfer from the hot gas flow (or into the cooling gas flow) the shell 20 has its outer surface 20b connected to a plurality of heat transfer pins 30.

Each of the heat transfer pins 30 has a large diameter head portion 30a located in juxtaposed relationship with the outer surface 20b. The pins 30 have an extended outer surface area defined by a cylindrical surface 30b and an end surface 30c which substantially increase the outer surface area of metal exposed to air flow through the cavity 24.

In accordance with the present invention, the pins 30 have their head portions 30a joined to the outer surface 20b by a weld nugget 32 which is formed by a capacitive discharge welding gun. Such a weld formation is limited solely to the interface 34 between the pins 30 and the shell 20 at the head portion 30a. Consequently, a shell surface region 20c formed between each of the pins 30 is clean of any welding material both during and after formation of the nugget 32.

More particularly, the pins 30 are located in a known capacitive discharge welding gun 40 of the type that has a charging circuit 40a; a circuit 40b that applies a low current flow through the pins 30 to form a small weld pool 32a at the interface 34 as shown in FIG. 4 in broken line. Once the small weld pool 32a is formed, a gun spring (not shown) forces the head portion 30a against a clean surface portion of the outer surface 20b and a bank of capacitors 40c discharges to direct a large current flow across the small weld pool 32a at the interface 34 to produce a welding arc that will almost instantaneously melt the metal of the shell only at the interface 34. The discharge is accomplished in less than one second for each weld joint. As soon as the capacitor bank is discharged the weld pool cools into the nugget 32. The resultant nugget 32 is hereinafter referred to as a capacitive weld joint. The instantaneous melting and rapid cooling from the surrounding metal results in no grain growth in the mold joint area. Such a joint is characterized by being formed in a local region of the metal shell 20 such that the shell 20 will not be heat distorted to thereby retain desired physical dimensions and thereby eliminate the need for additional machining once the pins 30 are connected to the shell.

The connected pins 30 form a good heat transfer path from the cavity 24 through the metal of the shell 20 and into the thermoplastic material deposited on the inner surface 20a of the metal shell 20. In addition to providing a good heat transfer path the provision of the pins 30 and capacitive weld joint connection combine to substantially extend the surface area on the gas side of the mold shell 20 thereby to increase the heat transfer rate to the mold so as to reduce part molding cycle times.

The capacitive weld step heats only a small portion of the mass of the material as the joints 32 are formed. Consequently, the metal of the shell is not degraded to the same extent as in the case of solder, brazed or gas weld connections between a mold formed as a thin metal shell.

An example of thin metal shells to which the pins 30 are connected is a mold which is formed by electroforming a thin layer of nickel against a mandrel. The nickel is deposited in a thickness which will provide sufficient structural strength to hold the part during molding; to have sufficient strength to permit safe connection and disconnection of a metal shell to mold apparatus; and to have sufficient strength to permit the metal shell to be rotated for evenly distributing the plastisol material across the casting surface thereof. The capacitive weld joints 32 provide a strong physical connection between pins 30 and shell 20. The joints 32 also serve as a good heat conductor from the extended outer surface area 30b of the pin 30.

The invention has been described in an illustrative manner, and it is to be understood that the terminology which has been used herein is intended to be in the nature of words of description rather than of limitation. Obviously, many modifications and variations of the present invention are possible in light of the aforesaid teachings. It is therefore, to be understood that within the scope of the appended claims, the invention may be practiced otherwise than as specifically described.

What is claimed is:

1. A mold assembly for molding thermoplastic particles into a solid thin shell the assembly including a metal shell having a cavity and including an outer surface exposed to a heat source and further including an inner surface on which thermoplastic material is cast and fused to form a thin layer thermoplastic shell the assembly comprising:

a plurality of heat transfer pins connected to said metal shell at the outer surface thereof;

each of said heat transfer pins including an extended portion having an extended outside surface area exposed to the heat source for heating said metal shell and each of said heat transfer pins further including a large diameter head portion;

said large diameter head portion located in juxtaposed relationship with said outer surface and a weld nugget formed solely between said head portion and said metal shell for interconnecting each heat transfer pin to said metal shell;

said outer surface of said metal shell having a clean weld-free surface portion formed between said head portions which combines with said extended outside surface areas of said heat transfer pins to define a total heat transfer surface area greater than that of said outer surface for enhancing heat flow from said heat source to thermoplastic material deposited on said inner surface for heating the thermoplastic material to fuse the material into a thin layer thermoplastic shell.

* * * * *